Aug. 1, 1933.  C. DANTSIZEN  1,920,845
REFRIGERATING SYSTEM
Filed Oct. 26, 1932
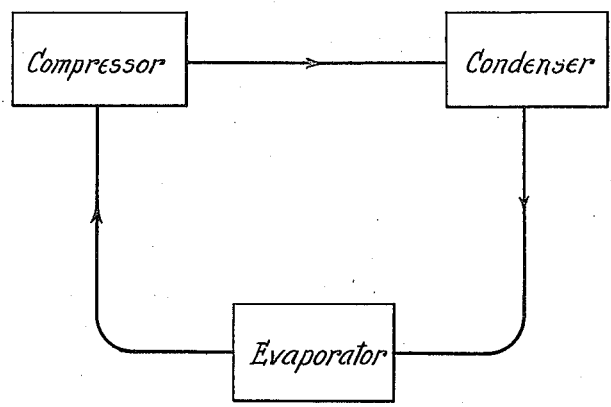
Refrigerant — Methyl Formate.
Lubricant — Refined Mineral Oil & Lard Oil.
Inventor
Christian Dantsizen
by Charles E. Tuller
His Attorney Patented Aug. 1, 1933

1,920,845

UNITED STATES PATENT OFFICE 1,920,845

REFRIGERATING SYSTEM

Christian Dantsizen, Schenectady, N. Y., assignor to General Electric Company, a Corporation of New York Application October 26, 1932. Serial No. 639,606

12 Claims. (Cl. 62—178)

The present invention relates broadly to refrigerating systems and is more specifically concerned with refrigerating systems of the closed type employing methyl formate as the refrigerant.

I have found methyl formate to be an excellent refrigerant for certain types of refrigerating machines for instance those of the compressor type. In my Patent No. 1,828,559 dated Octobed 20, 1931, I have described and claimed the use of methyl formate as a refrigerant in a refrigerating system. Where methyl formate is employed as the refrigerant, the system, generally speaking, may be similar to that shown in the patent to Steenstrup No. 1,736,635 dated November 19, 1929, and may be provided with a gastight casing enclosing the refrigerating unit and forming part of a closed system.

In the accompanying drawing which forms a part of the present application there is shown diagrammatically a refrigerating system including my invention.

In the operation of refrigerating machines employing methyl formate as the refrigerant it has been found that small quantities of non-condensible gaseous decomposition products occur which are, obviously, objectionable. I have found that I can substantially eliminate the formation of such gaseous products by the use of a small amount, say a few percent by weight of fatty acid or a glyceride of a fatty acid, for example vegetable and animal oils, with the lubricating oil employed in the system. The lubricating oil usually employed is a high refined mineral oil such as a medicinal oil, for example an oil of the type sold under the mark Nujol.

I prefer to employ with the mineral oil about 2% by weight of lard oil. The lard oil is preferred because of its property of remaining fluid at low temperatures.

While I do not wish to be limited to the precise theory I shall set forth I believe the following to be an explanation of the action of the fatty acid glyceride to eliminate the objectionable non-condensible gaseous decomposition by-products in the system.

Two types of decomposition occur in the system, thermal decomposition of the methyl formate, for the most part in the compressor chamber, and decomposition of the methyl formate due to hydrolysis.

True thermal decomposition of methyl formate probably yields principally carbon monoxide and hydrogen, for at higher temperatures methyl formate decomposes to form carbon monoxide and methyl alcohol, the latter decomposing at the same temperatures to carbon monoxide and hydrogen:

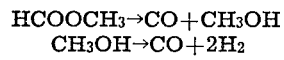
$$CH_3OH \rightarrow CO + 2H_2$$

But, in a refrigerating machine charged with a quantity of methyl formate, the percentage of methyl alcohol produced in the first reaction will probably remain small enough for such a long time that hydrogen will not appear in any great quantities.

Metallic surfaces, and particularly, the small particles of iron and copper dust left on all machine parts, probably tend to catalyze the above reactions. Lard oil, and also other animal and vegetable oils, contain free fatty acid. Lard oil contains about 5% free oleic acid and this free acid forms metallic soaps with the iron and copper particles, namely iron oleate and copper oleate. These soaps tend to cover the metallic parts and even though the layer of soap may be of molecular thickness it probably poisons the catalysts thus diminishing the catalytic action of the metal. Hence the free oleic acid (or other fatty acid free in the particular glyceride used) acts to cut down the production of the free gaseous products.

The second type of dissociation or decomposition taking place in the system is due to hydrolysis. Hydrolysis of methyl formate takes place owing to the traces of moisture left in the windings of the driving motor and entrapped in the walls of the casing. This dissociation is represented by the equation:

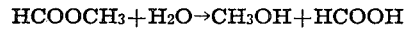

The formic acid thus produced reacts on metallic surfaces giving metallic formates and free hydrogen. However, since formic acid is a very much stronger acid than oleic acid, glycerol formate will probably form in the presence of lard oil, releasing oleic acid without the formation of water. In this way the harmful formic acid is fixed while the beneficial oleic acid is liberated.

The use of the glyceride of the fatty acid has proved to be more beneficial than the use of the free fatty acid itself. Tests have shown that the addition of small percentages of oleic acid to white lubricating oil cuts down roughly to 50% the rate of evolution of non-condensible gases, while the use of the glyceride of oleic acid, such as lard oil, has proved to be of more benefit than the free acid itself. Bomb tests carried out at 300° F. have shown that the presence of lard oil cuts down the formation of gases to at least 1/8 of what it is without its presence. In the performance of refrigerating units operating under normal conditions the effect of the lard oil is more marked. In such case it is of the order of 1/10 or less of what it is without its presence.

While I have indicated that I prefer to use about 2% by weight of the glyceride of a fatty acid with the mineral lubricating oil, I wish it to be understood that this amount is not fixed or limiting in character. Only a small quantity of the glyceride need be used and while greater amounts than 2% are not harmful there is probably no advantage in using amounts over about 10% by weight of the lubricating oil. Again, amounts under 2% may be used with good results.

What I claim as new and desire to secure by Letters Patent of the United States, is:

1. A refrigerating system including methyl formate as a refrigerant which tends to produce non-condensible gaseous decomposition products during operation of the system and a few per cent of a fatty acid material therein which effectively cuts down the formation of said non-condensible gaseous decomposition products.

2. A refrigerating system including methyl formate as a refrigerant and a few per cent of a glyceride of a fatty acid therein which effectively cuts down the formation of non-condensible gaseous decomposition products.

3. A refrigerating system including a compressor, said system having a refined mineral oil therein for lubricating the parts of the compressor, a refrigerant circulated through the system by said compressor and coming in contact with said lubricating oil, said refrigerant consisting of methyl formate and said mineral oil containing a few per cent by weight of a glyceride of a fatty acid.

4. A refrigerating system including a compressor, said system having a refined mineral oil therein for lubricating the parts of the compressor, a refrigerant circulated through the system by said compressor and coming in contact with said lubricating oil, said refrigerant consisting of methyl formate and said mineral oil containing about 2% by weight of lard oil.

5. A refrigerating system including a compressor, said system having a refined mineral oil therein for lubricating the parts of the compressor, a refrigerant circulated through the system by said compressor and coming in contact with said lubricating oil, said refrigerant consisting of methyl formate and said mineral oil containing a few per cent of fatty acid.

6. A refrigerating system including a compressor, said system having a refined mineral oil therein for lubricating the parts of the compressor, a refrigerant circulated through the system by said compressor and coming in contact with said lubricating oil, said refrigerant consisting of methyl formate and said mineral oil containing a few per cent of oleic acid.

7. A refrigerating system including methyl formate as a refrigerant which tends to produce by hydrolysis objectionable free acid during operation of the system and a few per cent of a fatty acid material therein which tends to eliminate said objectionable free acid.

8. A method of reducing the production of non-condensible gaseous decomposition products in a refrigerating system which comprises circulating a few per cent by weight of a glyceride of a fatty acid through said system in contact with the refrigerant therein.

9. A method of reducing the production of non-condensible gaseous decomposition products in a refrigerating system employing methyl formate as the refrigerant which comprises circulating a few per cent by weight of a glyceride of a fatty acid through said system in contact with said methyl formate.

10. A method of reducing the production of non-condensible gaseous decomposition products in a refrigerating system employing methyl formate as the refrigerant which comprises circulating a refined mineral lubricating oil containing a few per cent by weight of a glyceride of a fatty acid through said system and in contact with said methyl formate.

11. A method of reducing the production of non-condensible gaseous decomposition products in a refrigerating system employing methyl formate as the refrigerant which comprises circulating a refined mineral lubricating oil containing a few per cent by weight of fatty acid through said system and in contact with said methyl formate.

12. A mthod of reducing the production of non-condensible gaseous decomposition products in a refrigerating system employing methyl formate as the refrigerant which comprises circulating a refined mineral lubricating oil containing a few per cent by weight of oleic acid through said system and in contact with said methyl formate.

CHRISTIAN DANTSIZEN.